(12) United States Patent
Suzuki

(10) Patent No.: US 12,467,643 B2
(45) Date of Patent: Nov. 11, 2025

(54) REFRIGERANT DISTRIBUTION DEVICE

(71) Applicant: Mitsubishi Electric Corporation, Tokyo (JP)

(72) Inventor: Yuta Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 18/548,638

(22) PCT Filed: Jul. 1, 2021

(86) PCT No.: PCT/JP2021/024906
§ 371 (c)(1),
(2) Date: Sep. 1, 2023

(87) PCT Pub. No.: WO2023/276099
PCT Pub. Date: Jan. 5, 2023

(65) Prior Publication Data
US 2024/0142118 A1 May 2, 2024

(51) Int. Cl.
*F24F 1/32* (2011.01)
*F25B 41/20* (2021.01)
*F25B 41/42* (2021.01)

(52) U.S. Cl.
CPC .............. *F24F 1/32* (2013.01); *F25B 41/20* (2021.01); *F25B 41/42* (2021.01)

(58) Field of Classification Search
CPC .............. F24F 1/32; F25B 41/20; F25B 41/42
See application file for complete search history.

(56) References Cited

U.S. PATENT DOCUMENTS 4,578,902 A * 4/1986 Niekrasz ................. F25D 21/04
49/70
6,425,697 B1 * 7/2002 Potts ........................ F41A 33/00
396/419

(Continued)

FOREIGN PATENT DOCUMENTS

JP 2006-300381 * 11/2006
JP 2006-300381 A 11/2006

(Continued)

OTHER PUBLICATIONS

International Search Report of the International Searching Authority mailed Aug. 3, 2021, in corresponding International Application No. PCT/JP2021/024906 (and English translation).

(Continued)

Primary Examiner — Henry T Crenshaw
(74) Attorney, Agent, or Firm — Posz Law Group, PLC

(57) ABSTRACT

A refrigerant distribution device includes: first refrigerant pipes connected to refrigerant pipes extending from an outdoor unit; second refrigerant pipes connected to refrigerant pipes extending from indoor units; solenoid valves provided on at least two or more of the second refrigerant pipes; a controller having a first terminal portion to which wires that extend from the solenoid valves and a second terminal portion to which wires extending from the outdoor unit are connected; and a case. First refrigerant pipes have a first connection portion connectable to the refrigerant pipes that extend from one side of the case, and a second connection portion connectable to the refrigerant pipes that extend from the other side of the case. The first and second terminal portions are mutually disposed in differing locations, and the controller is detachable and attachable to the case when the controller is rotated 180 degrees around an axis.

12 Claims, 10 Drawing Sheets

(56) References Cited

U.S. PATENT DOCUMENTS

| | | | |
|---|---|---|---|
| 9,068,758 B2* | 6/2015 | Matsuura | F25B 41/42 |
| 9,353,957 B2* | 5/2016 | Matsuura | F24F 1/32 |
| 9,689,578 B2* | 6/2017 | Matsuura | F24F 1/32 |
| 2009/0049855 A1* | 2/2009 | Murata | F24F 1/34 |
| | | | 29/890.03 |
| 2012/0000227 A1* | 1/2012 | Matsuura | F24F 1/34 |
| | | | 62/175 |
| 2012/0000553 A1 | 1/2012 | Matsuura et al. | |
| 2016/0238997 A1* | 8/2016 | Baldwin | E05D 7/1077 |

FOREIGN PATENT DOCUMENTS

| | | |
|---|---|---|
| JP | 2012-013273 A | 1/2012 |
| JP | 2013-174424 A | 9/2013 |
| JP | 2020-070956 A | 5/2020 |

OTHER PUBLICATIONS

Office Action dated Feb. 14, 2025 issued in the corresponding Australian Patent Application No. 2021453694.

* cited by examiner

REFRIGERANT DISTRIBUTION DEVICE

CROSS REFERENCE TO RELATED APPLICATION

This application is a U.S. national stage application of International Application No. PCT/JP2021/024906, filed on Jul. 1, 2021, the contents of which are incorporated herein by reference.

TECHNICAL FIELD

The present disclosure relates to a refrigerant distribution device.

BACKGROUND

In an example of Patent Document 1, a refrigerant circuit unit that distributes a refrigerant to a plurality of indoor units from an outdoor unit is described. In the refrigerant circuit unit of Patent Document 1, connection pipes are led out from two side surfaces of a left-right direction of a main body case. According to a positional relationship of the outdoor unit and the refrigerant circuit unit, the connection pipes that extend from the outdoor unit are connected to the connection pipes that are led out of one side surface out of the two side surfaces of the left-right direction of the main body case.

PATENT DOCUMENT

Patent Document 1: Japanese Unexamined Patent Application, First Publication 2013-174424

In a refrigerant circuit unit such as the above, there is a case where a plurality of solenoid valves and controllers to control the solenoid valves are provided, and wiring that extends from an outdoor unit is connected to the controllers. Based on the relative positional relationship of the outdoor unit and the refrigerant circuit unit, there are cases where connecting the wiring that extend from the outdoor unit to the controller is difficult in the case above. Thus, a case where it is difficult to carry out connection work of the outdoor unit with respect to the refrigerant circuit unit exists.

SUMMARY

The present disclosure has been made in order to address the problem above, and an object is to provide a refrigerant distribution device that is constructed so as make it possible to improve connection work when connecting the outdoor unit to the refrigerant distribution device.

A refrigerant distribution device according to an embodiment of the present invention that is provided in an air conditioner, and that distributes a refrigerant to a plurality of indoor units from an outdoor unit. The refrigerant distribution device includes first refrigerant pipes that are connected to refrigerant pipes that extend from the outdoor unit, a plurality of second refrigerant pipes that are connected to the first refrigerant pipes and are connected to each of the refrigerant pipes that extends from the plurality of indoor units, a plurality of solenoid valves that are provided on at least two or more of the second refrigerant pipes out of the plurality of second refrigerant pipes, a controller having a first terminal portion to which a plurality of wires that extend from the plurality of solenoid valves, and a second terminal portion to which wires that extend from the outdoor unit are connected to; and a case that houses at least a portion of the first refrigerant pipe, at least a portion of the plurality of second refrigerant pipes, the plurality of solenoid valves, and the controller therein. The first refrigerant pipes have a first connection portion that is connectable to the refrigerant pipes that extend from the outdoor unit from one side of a first direction of the case, and a second connection portion that is connectable to the refrigerant pipes that extend from the outdoor unit from the other side of a first direction of the case, the first terminal portion and the second terminal portion are mutually disposed in differing locations in the first direction. The controller is attached so as to be detachable with respect to the case, and is attachable to the case in a state where the controller is rotated 180 degrees around an axis that extends in a second direction orthogonal to the first direction.

According to the present disclosure, it is possible to improve connection work when connecting an outdoor unit to a refrigerant distribution device.

DETAILED DESCRIPTION

An embodiment is explained below with reference to the drawings. The scope of the present disclosure is not limited to the embodiments thereof, and may be changed accordingly within the limits of the technical background of the present disclosure. Scales and dimensions or the like are added to drawings of various configurations below for easier understanding of the configuration, and there are cases where scales and dimensions or the like in actual configurations differ from the scales and configurations thereof.

Figure 1:
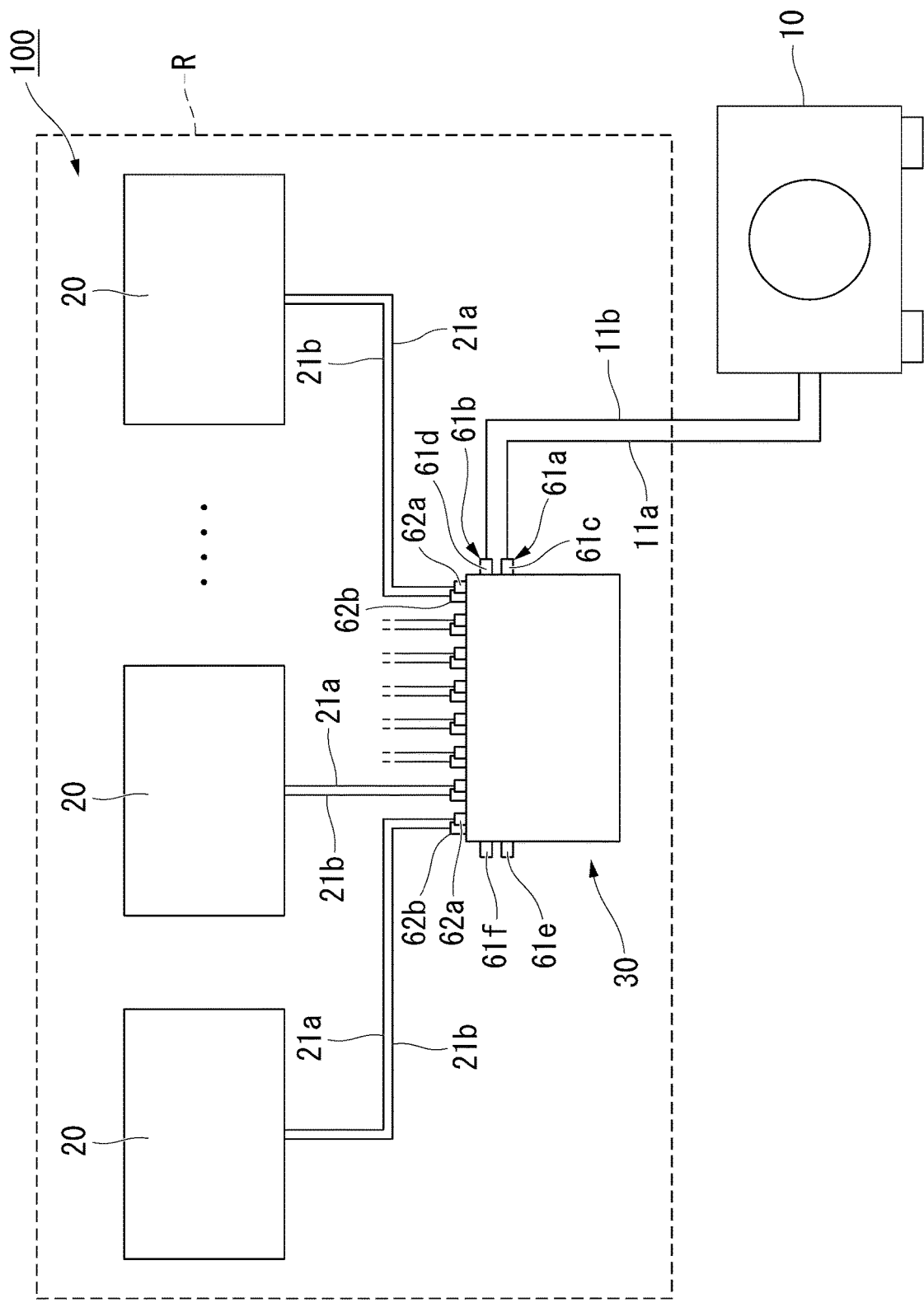
FIG. 1 A schematic block diagram that schematically shows an air conditioner which includes a refrigerant distribution device in an embodiment.

FIG. 1 is a schematic block diagram that schematically shows an air conditioner 100 which includes a refrigerant distribution device 30, in the embodiment of the present disclosure. As shown in FIG. 1, the air conditioner 100 includes an outdoor unit 10, a plurality of indoor units 20, and a refrigerant distribution device 30. The plurality of indoor units 20 are disposed inside a room R. The outdoor unit 10 is disposed outside the room R. The plurality of indoor units 20 are connected to a single outdoor unit 10 through the refrigerant distribution device 30. Although FIG. 1 shows a state where a plurality of indoor units 20 are disposed inside one room R, the embodiment of the present disclosure is not limited thereto. It is possible to dispose each of the plurality of indoor units 20 inside different rooms R.

It is possible to connect the plurality of indoor units 20 to one outdoor unit 10 using the refrigerant distribution device 30. With respect to the single outdoor unit 10, it is possible to connect a maximum of eight indoor units 20 using the refrigerant distribution device 30 of the present embodiment. Two refrigerant pipes 11*a*, 11*b* that extend from the outdoor unit 10, and two refrigerant pipes 21*a*, 21*b* that extend from each of the plurality of indoor units 20 are connected to the refrigerant distribution device 30. For example, the refrigerant distribution device 30 may be disposed in a ceiling space or the like of the room R.

The refrigerant distribution device 30 is a device that distributes a refrigerant to the plurality of indoor units 20 from the outdoor unit 10. A refrigerant with a low global warming potential (GWP: Global Warming Potential) such as a fluorine refrigerant, or a hydrocarbon refrigerant or the like may for example, may be mentioned as the refrigerant. The refrigerant flows to the refrigerant distribution device 30 through the refrigerant pipes 11*a*, 11*b* that extend from the outdoor unit 10. The refrigerant flows from the refrigerant distribution device 30 so as to be distributed to each of the plurality of indoor units 20. The refrigerant that flows from the refrigerant distribution device 30 to each of the indoor units 20 flows to the indoor units 20 through one of the refrigerant pipes 21*a* or 21*b*, and returns to the refrigerant distribution device 30 through the other of the refrigerant pipes 21*a* or 21*b*. The refrigerant that returns to the refrigerant distribution device 30 goes through the other of the refrigerant pipes 11*a* or 11*b* and returns to the outdoor unit 10. As such, the refrigerant circulates between the outdoor unit 10 and the indoor units 20 through the refrigerant distribution device 30.

Hereinafter, an X axis, a Y axis, and a Z axis are shown on each drawing, and along with determining directions along each of the axes, various parts of the refrigerant distribution device 30 are explained. A direction along the X axis is referred to as a "depth direction X". A direction along the Y axis is referred to as a "width direction Y". A direction along the Z axis is referred to as a "height direction Z. The depth direction X, the width direction Y and the height direction Z are directions that are mutually orthogonal to one another. Out of directions of the depth direction X, a direction in which an arrow of the X axis faces (+X side) is referred to as a "one side of the depth direction", and an opposite direction to which the arrow of the X axis faces (−X side) is referred to as an "other side of the depth direction". Out of directions of the width direction Y, a direction in which an arrow of the Y axis faces (+Y side) is referred to as a "one side of the width direction", and an opposite direction out of directions of the width direction Y to which the arrow of the Y axis faces (−Y side) is referred to as an "other side of the width direction". Out of directions of the height direction Z, a direction in which an arrow of the Z axis faces (+Z side) is referred to as a "top side", and an opposite direction to which the arrow of the Z axis faces (−Z side) is referred to as a "bottom side".

The width direction Y corresponds to a "first direction", and the depth direction X corresponds to a "second direction" in the present embodiment. The one side of the width direction (+Y side) corresponds to "one side of the first direction", and the other side of the width direction (−Y side) corresponds to a "the other side of the first direction". The depth direction X, the width direction Y and the height direction Z simply describe a relative positional relationship of the various parts of the refrigerant distribution device 30, and in no way limit the orientation or the like that the refrigerant distribution device 30 is disposed in.

Figure 2:
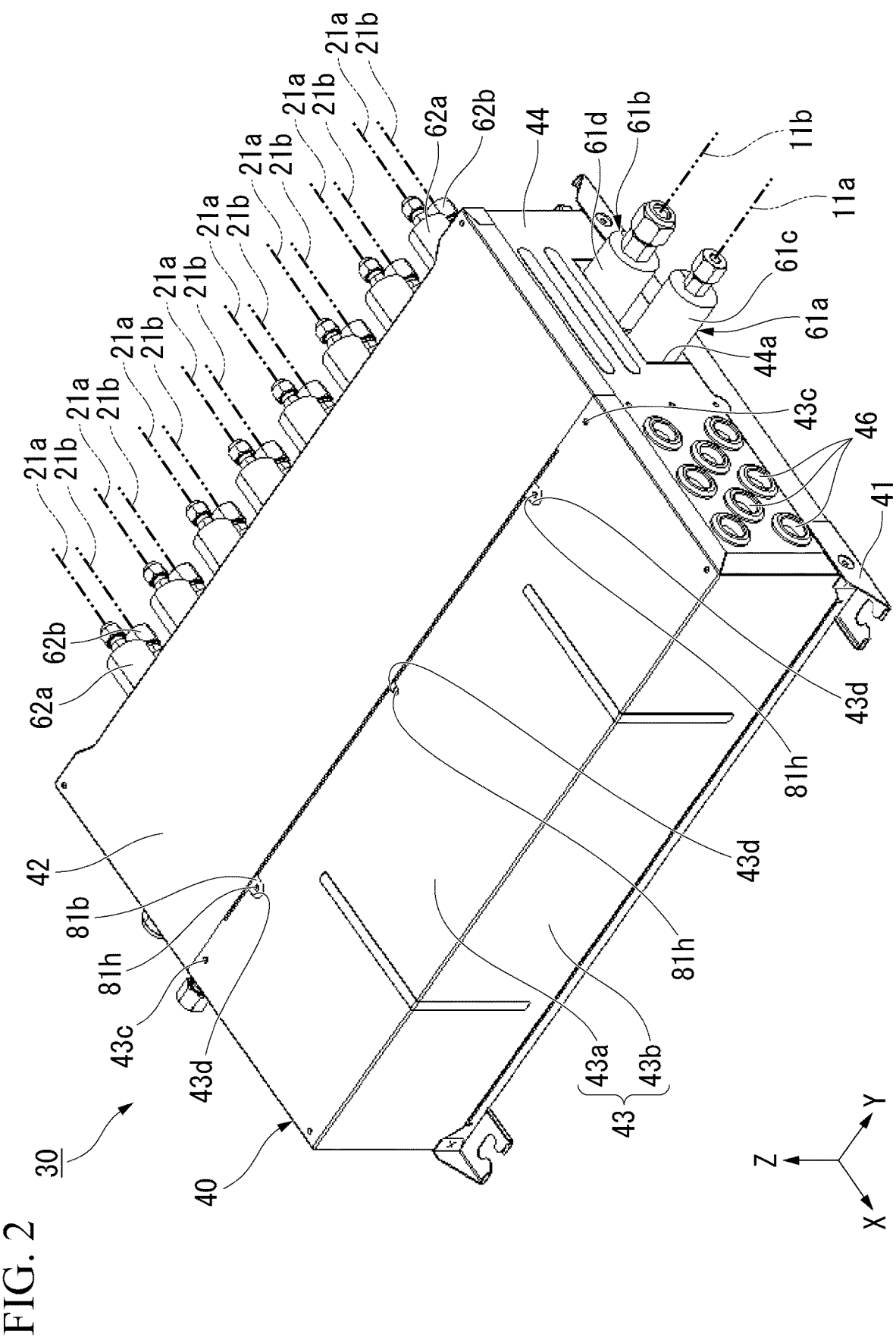
FIG. 2 A perspective view that shows the refrigerant distribution device in the embodiment.
Figure 3:
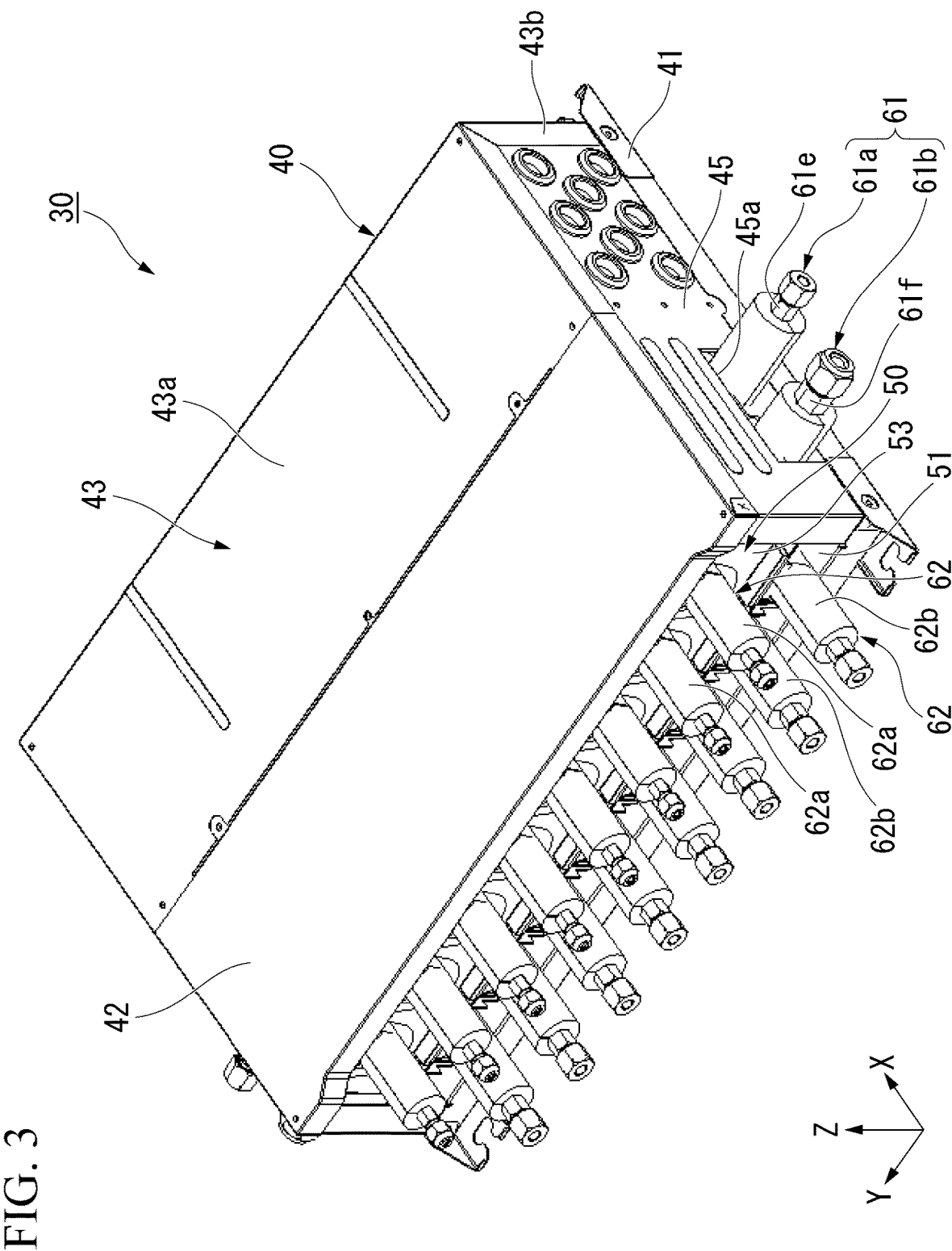
FIG. 3 A perspective view that shows the refrigerant distribution device in the embodiment, where the refrigerant distribution device is seen from a direction that differs from the direction of FIG. 2.
Figure 4:
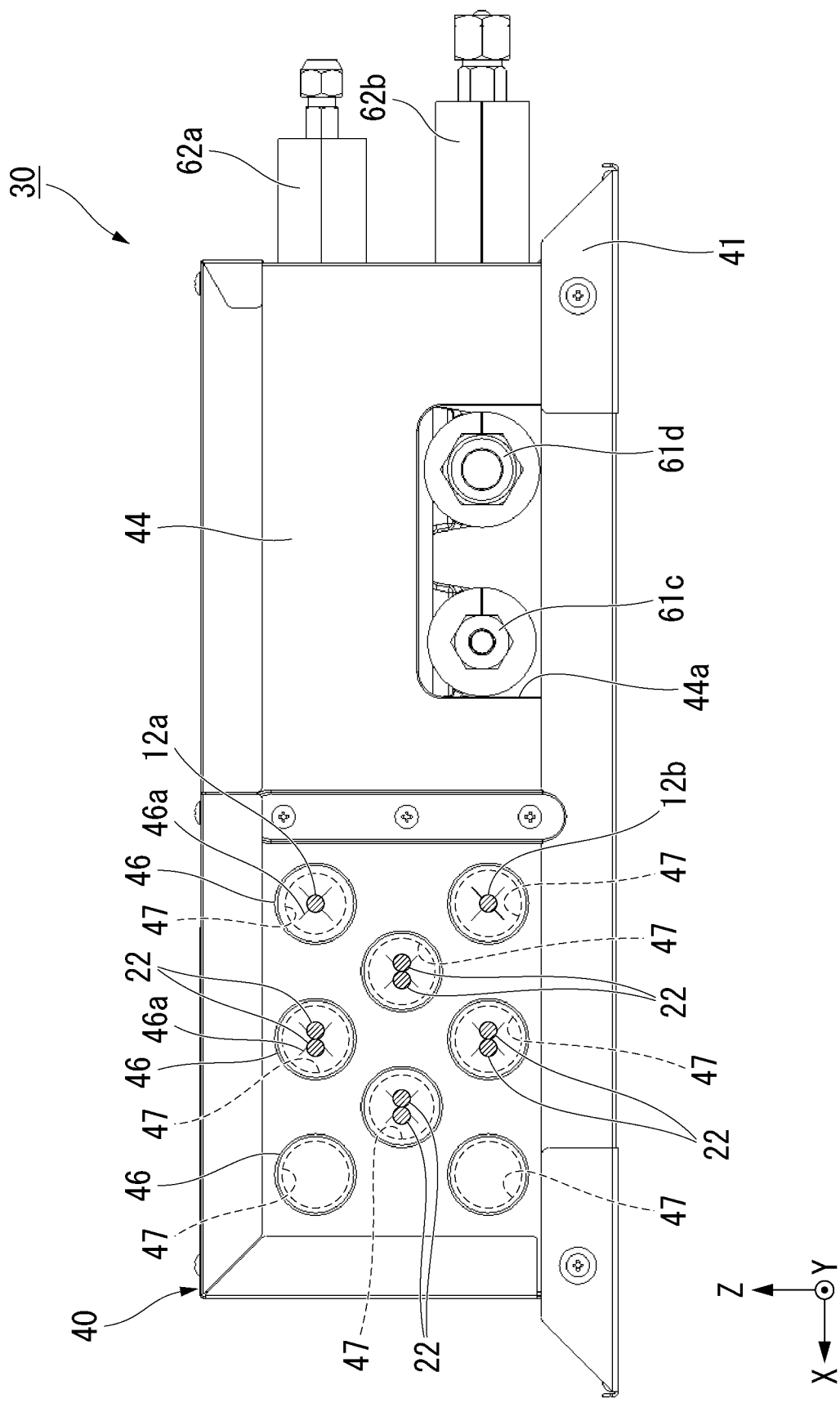
FIG. 4 A view that shows one side out of sides seen from a width direction of the refrigerant distribution device in the embodiment.
Figure 5:
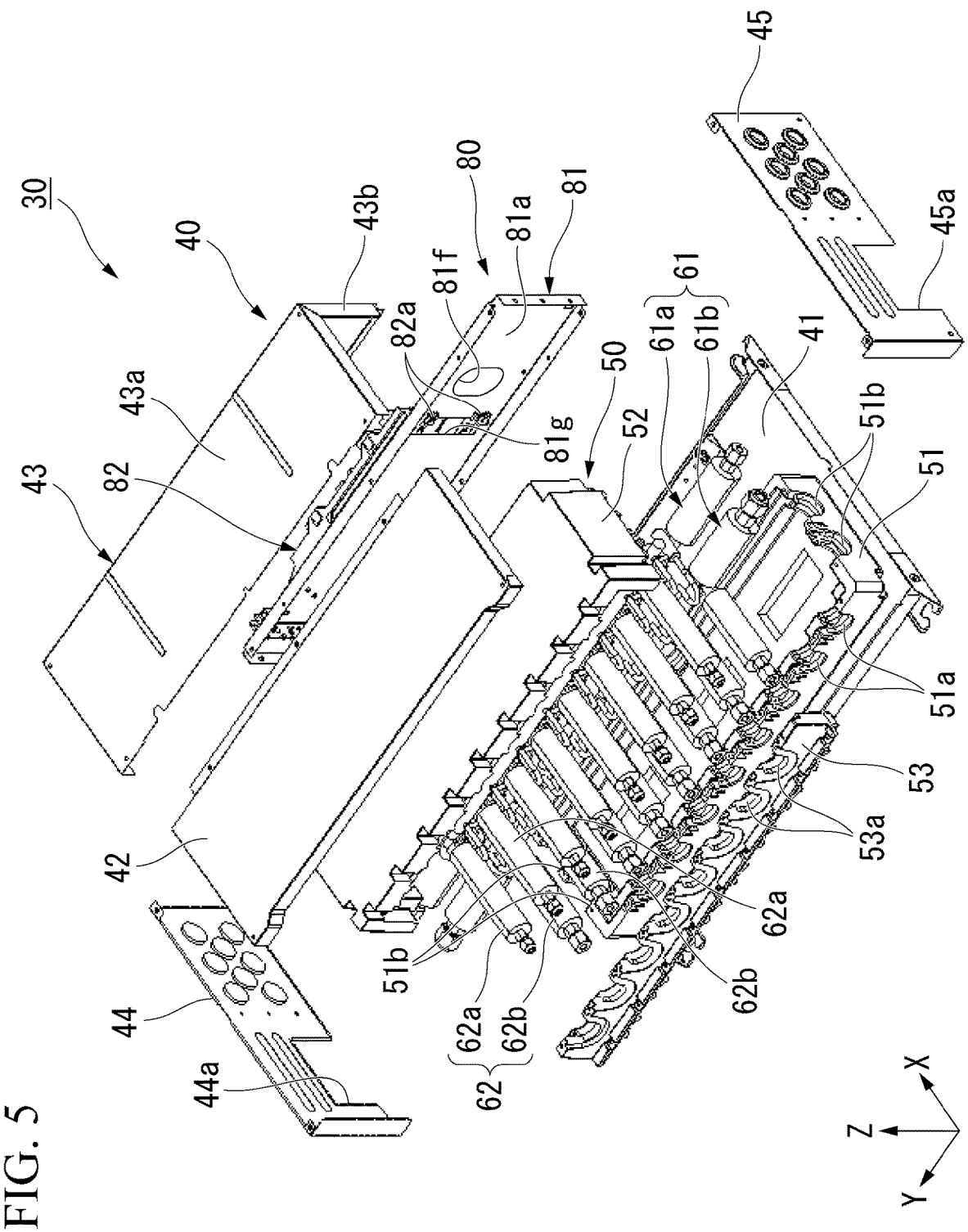
FIG. 5 An exploded perspective view that shows the refrigerant distribution device in the embodiment.
Figure 6:
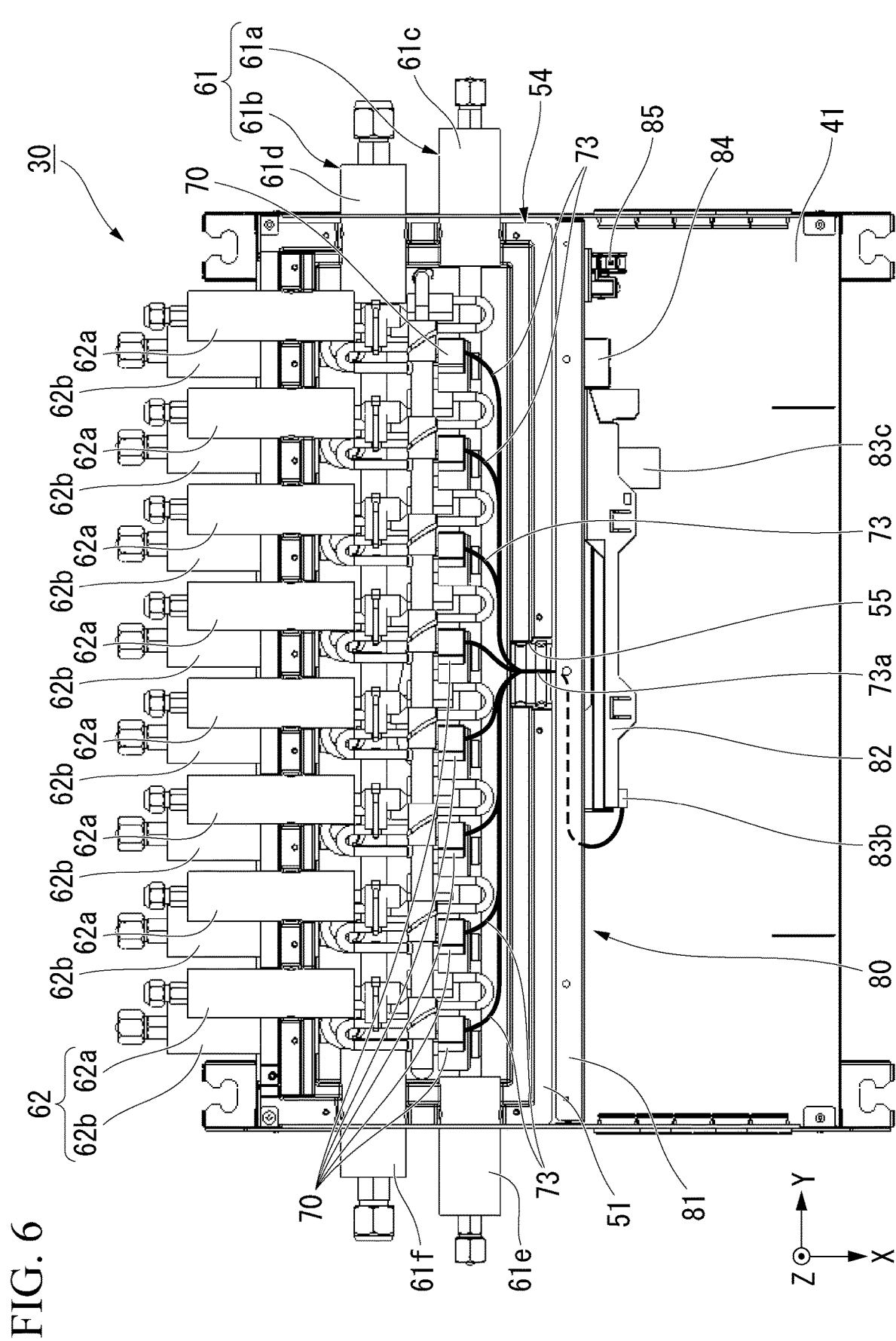
FIG. 6 A view of a portion of the refrigerant distribution device as seen from a top side in the embodiment.
Figure 7:
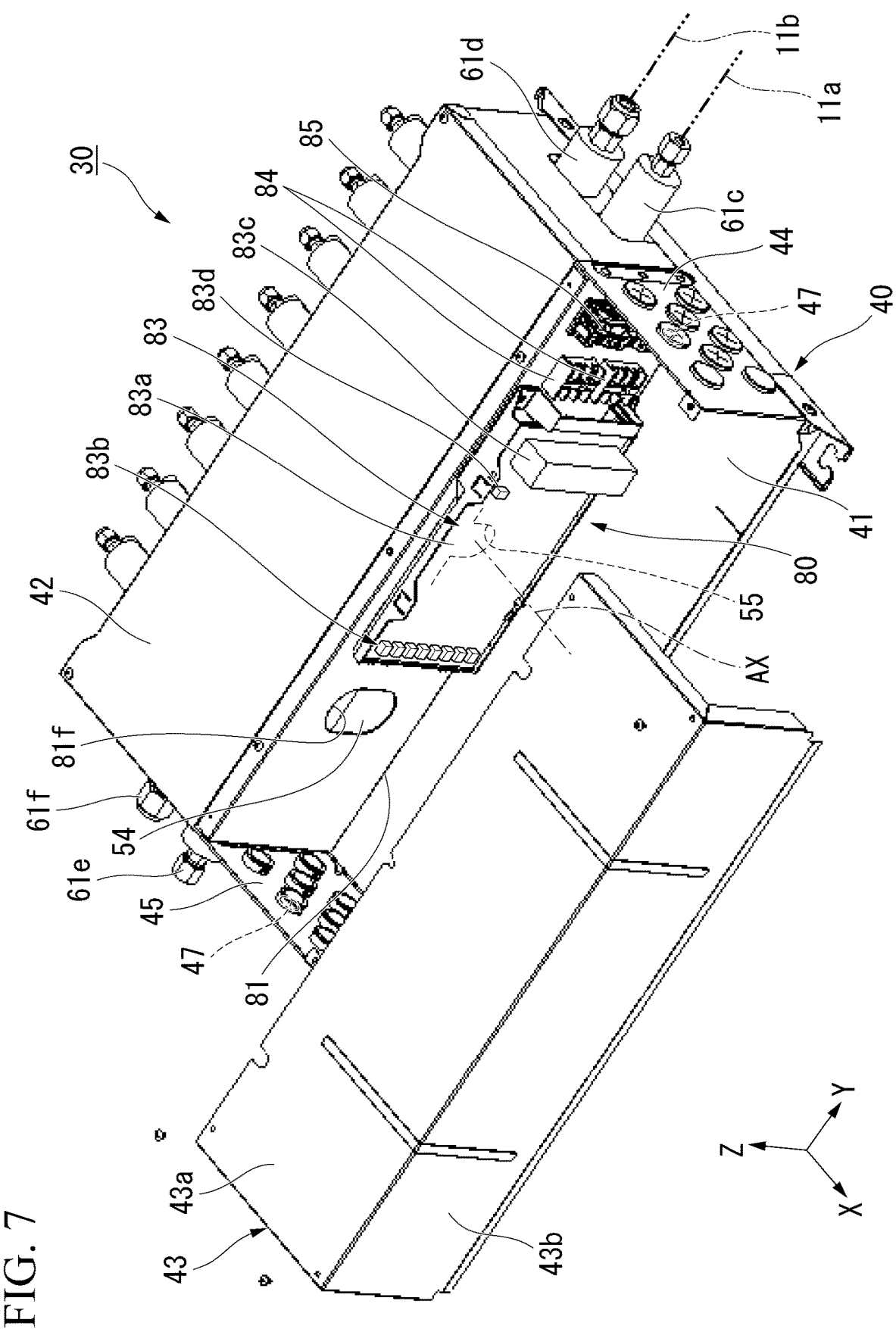
FIG. 7 An exploded perspective view that shows the refrigerant distribution device in the embodiment, and is a view that shows the refrigerant distribution device in a state where a controller cover is removed.
Figure 8:
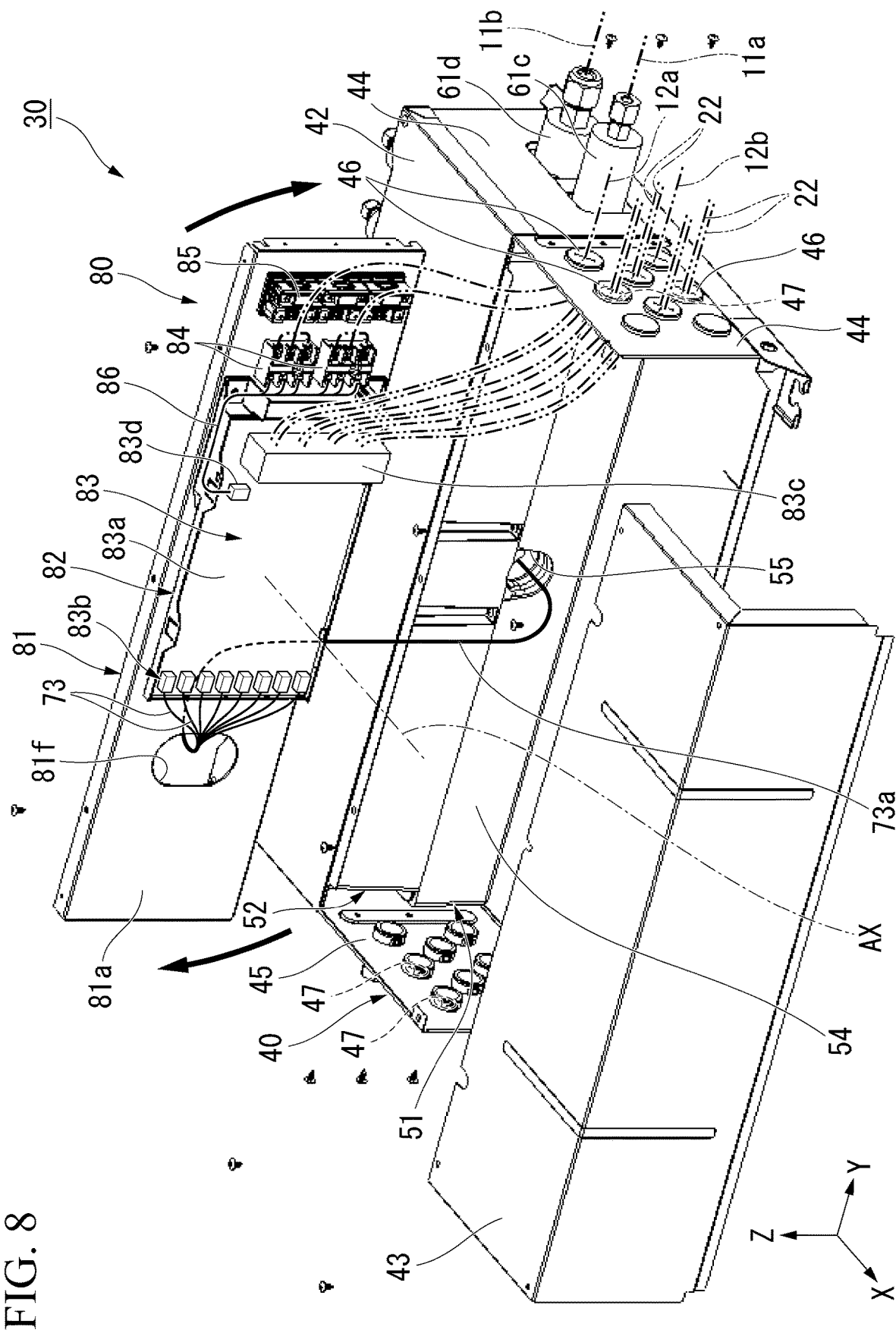
FIG. 8 An exploded perspective view that shows the refrigerant distribution device in the embodiment, and is a view that shows the refrigerant distribution device in a state where the controller cover and the controller are removed.

FIG. 2 is a perspective view that shows the refrigerant distribution device 30. FIG. 3 is a perspective view that shows the refrigerant distribution device 30, where the refrigerant distribution device 30 is seen from a direction that differs from the direction of FIG. 2. FIG. 4 is a view that shows the refrigerant distribution device 30 as seen from one side of the width direction (+Y side). FIG. 5 is exploded perspective view that shows the refrigerant distribution device 30. FIG. 6 is a view of a portion of the refrigerant distribution device 30 as seen from a top side. FIG. 7 is an exploded perspective view that shows the refrigerant distribution device 30, and is a view that shows the refrigerant distribution device 30 in a state where a controller cover 43, to be mentioned later on, is removed. FIG. 8 is an exploded perspective view that shows the refrigerant distribution device 30, and is a view that shows the refrigerant distribution device 30 in a state where the controller cover 43 and a controller 80 are removed.

The refrigerant distribution device 30 in the embodiment is flat in the height direction Z, and is roughly a rectangular shape in the width direction Y as shown in FIG. 2 to FIG. 4 in the present embodiment. It is possible to invert the orientation of the refrigerant distribution device 30 shown in FIG. 2 to FIG. 4 in the height direction Z for example, so that the orientation is such that the refrigerant distribution device 30 is fixed to a ceiling board or the like. As shown in FIG. 5, the refrigerant distribution device 30 includes a case 40, a thermal insulation member 50, first refrigerant pipes 61, a plurality of second refrigerant pipes 62, and the controller 80. As shown in FIG. 6, the refrigerant distribution device 30 includes a plurality of solenoid valves 70.

As shown in FIG. 3, the case 40 is flat in the height direction Z and is roughly a rectangular box shape in the width direction Y. The case 40 houses the thermal insulation member 50, a portion of the first refrigerant pipes 61, a portion of the second refrigerant pipes 62, the plurality of solenoid valves 70, and the controller 80 on the inside. The case 40 is open in the other side of the depth direction (−X side). As shown in FIG. 5, the case 40 has a bottom panel 41, a top panel 42, a controller cover 43, and a pair of side surface panels (side wall portions) 44, 45. The bottom panel 41, the top panel 42, the controller cover 43, and the pair of side surface panels 44, 45 are respectively separate entities. The bottom panel 41, the top panel 42, the controller cover 43, and the pair of side surface panels 44, 45 are each made of a formed metallic flat member.

The flat surfaces of the bottom panel 41 and the top panel 42 face the height direction Z, and are roughly rectangular plate shapes in the width direction Y. A wall portion of a bottom side of the case 40 is configured by the bottom panel 41. The top panel 42 is located apart from a top side of a part out of parts of the bottom panel 41 of the other side of the depth direction (−X side).

The controller cover 43 has a first cover portion 43*a* and a second cover portion 43*b*. The first cover portion 43*a* is a flat surface that faces the height direction Z, and is roughly a rectangular plate shape in the width direction Y. As shown in FIG. 3, the first cover portion 43a is connected to the one side of the depth direction (+X side) of the top panel 42. An edge portion of the other side of the depth direction (−X side) of the first cover portion 43a overlaps the top side of the edge portion of the one side of the depth direction of the top panel 42. A wall portion of a top side of the case 40 is configured by the top panel 42 and the first cover portion 43a. The first cover portion 43a covers the controller 80 from the top side.

The second cover portion 43b protrudes to the bottom side from the edge portion of the one side of the depth direction (+X side) of the first cover portion 43a. The second cover portion 43b is a flat surface that faces the depth direction X, and is roughly a rectangular plate shape in the width direction Y. The wall portion of the one side of the depth direction of the case 40 is configured by the second cover portion 43b. The second cover portion 43b covers the controller 80 from the one side of the depth direction. As shown in FIG. 7 and FIG. 8, the controller cover 43 is provided so as to be detachable.

As shown in FIG. 5, the pair of side surface panels 44, 45 are flat surfaces that face the width direction Y, and are roughly rectangular plate shapes in the depth direction X. The pair of side surface panels 44, 45 in the present embodiment correspond to the pair of side walls located on each side out both sides of the sides of the width direction Y of the case 40. The side surface panel 44 is the side wall of the one side of the width direction (+Y side) out of sides of the case 40. The side surface panel 45 is the side wall of the other side of the width direction (−Y side) out of sides of the case 40. The side surface panel 44 has a through hole 44a that penetrates the side surface panel 44 in the width direction Y. The side surface panel 45 has a through hole 45a that penetrates the side surface panel 45 in the width direction Y. Through holes 44a, 45a are rectangular holes provided on a portion out of portions of the other side of the depth direction (−X side) of each of the side surface panels 44, 45. The through holes 44a, 45a are open from the bottom side.

As shown in FIG. 4, the side surface panel 44 has a plurality of wiring holes 47 that penetrate the side surface panel 44 in the width direction Y. Eight of the wiring holes 47 are provided in the present embodiment. The wiring holes 47 are holes that are capable of passing through wires 12a, 12b that extend from the outdoor unit 10, along with being capable of passing through wires 22 that extend from the indoor units 20. Each of the wiring holes 47 have a cap member 46 attached. Cap members 46 may for example be made of rubber. Each of the cap members 46 blocks each of the wiring holes 47. A plus shaped slit 46a is formed on the cap members 46 attached to the wiring holes 47 that pass the wires 12a, 12b, and 22. In FIG. 4, out of eight of the cap members 46, six of the cap members 46 have slits 46a provided. As shown in FIG. 8, the plurality of wiring holes 47 are provided on the side surface panel 45, similarly to the side surface panel 44.

As shown in FIG. 5, thermal insulation member 50 is located inside the case 40. The thermal insulation member 50 is roughly a rectangular box shaped member housed inside a part of first refrigerant pipes 61 and a part of second refrigerant pipes 62. The thermal insulation member 50 extend in the width direction Y. The thermal insulation member 50 is configured of three members: a first member 51, a second member 52, and a third member 53.

The first member 51 configures the bottom side portion of the thermal insulation member 50. The first member 51 is a box shape that is open from a top side. Retention recesses 51a that recede to the bottom side from an upper end portion of a wall portion are provided on the wall portion of the other side of the depth direction (−X side) of the first member 51 are provided. The retention recesses 51a penetrate the wall portion of the other side of the depth direction of the first member 51 in the depth direction X. A plurality of the retention recesses 51a are provided along the width direction Y. Eight retention recesses 51a are provided in the present embodiment.

Retention recesses 51b that recede to the bottom side from the upper end portion of both wall portions of the width direction Y of the first member 51 are provided. The retention recesses 51b penetrate both the wall portions of the with direction Y of the first member 51, each in the width direction Y. Two of the retention recesses 51b are provided so as to be adjacent in the depth direction X, on each wall portion of the width direction Y.

The second member 52 configures a top side portion of the thermal insulation member 50. The second member 52 is a box shape that is open from the bottom side. The second member 52 is fixed to the top side of the first member 51. The second member 52 is open in the other side of the depth direction (−X side). A gap is provided in the height direction Z between the edge portion of the other side of the depth direction, and the wall portion of the other side of the depth direction of the first member 51 on the top side of the wall portion of the second member 52. Both the wall portions of the width direction Y of the second member 52 blocks an opening of the top side of the retention recesses 51b provided on each of both wall portions of the width direction Y of the first member 51.

As shown in FIG. 8, the wall portion of the one side of the depth direction (+X side) of the first member 51 and the wall portion of the one side of the depth direction of the second member 52 are connected in the height direction Z, and both configure the wall portion of the one side of the depth direction of the thermal insulation member 50. In the present embodiment, the one side of the depth direction of the thermal insulation member 50 is partition wall portion 54. As shown in FIG. 6, the partition wall portion 54 is located between the plurality of solenoid valves 70, and the depth direction X of the controller 80 on an inside of the case 40.

The partition wall portion 54 has a first through hole 55 that penetrates the partition wall portion 54 in the depth direction X. As shown in FIG. 8, the first through hole 55 in the present embodiment is configured by having the opening of the top side of a recess that recedes to the bottom side from the upper end portion on a wall portion of the one side of the depth direction (+X side) of the first member 51 be blocked by the wall portion of the one side of the depth direction of the second member 52. A plurality of a wire 73 that extend from the plurality of solenoid valves 70 are inserted through the first through hole 55. As shown in FIG. 7, the first through hole 55 coincides with a center of the width direction Y of the controller 80, as seen from the depth direction X. In the first through hole 55 of the present embodiment, an axis AX that passes through a center of the width direction Y and the height direction Z of the controller 80 passes through the first through hole 55. The axis AX is an imaginary axis that extends in the depth direction X.

As shown in FIG. 5, the third member 53 extends in the width direction Y The third member 53 is located in a space of the height direction Z of the edge portion of the other side of the depth direction (−X side) of the first member 51, and the edge portion of the other side of the depth direction of the second member 52. The third member 53 fills in the gap of the height direction Z of the edge portion of the other side of the depth direction on the wall portion of the top side of the second member 52, and the wall portion of the other side of the depth direction of the first member 51. The opening of a top side in the retention recesses 51a of the first member 51 is blocked by the third member 53.

The third member 53 has retention recesses 53a that recede to the bottom side from an upper end portion of the third member 53. The retention recesses 53a penetrate the third member 53 in the depth direction X. A plurality of the retention recesses 53a are provided along the width direction Y. Eight retention recesses 53a are provided in the present embodiment. Openings on the top side of the retention recesses 53a are blocked by the end portion of the other side of the depth direction (−X side) on the wall portion of the top side of the second member 52.

The first refrigerant pipes 61 are pipes that connect to the refrigerant pipes 11a, 11b that extend from the outdoor unit 10. The first refrigerant pipes 61 extend in the width direction Y. In the first refrigerant pipe 61 of the present embodiment, both a first refrigerant pipes 61a and first refrigerant pipe 61b are provided. The first refrigerant pipe 61a is a liquid pipe, and the first refrigerant pipe 61b is a gas pipe. A refrigerant in a gas-liquid two-phase may for example, flow through the first refrigerant pipe 61a. A refrigerant in a gas phase may for example, flow through the first refrigerant pipe 61b. An inner diameter of the first refrigerant pipe 61b is larger than an inner diameter of the first refrigerant pipe 61a. Both the first refrigerant pipes 61a, 61b are adjacently disposed in the depth direction X. The first refrigerant pipe 61b is disposed in the other side of the depth direction (−X side) of the first refrigerant pipe 61a. Each of the first refrigerant pipes 61a, 61b protrudes to both sides in the width direction Y more than the thermal insulation member 50, through the retention recesses 51b. The first refrigerant pipes 61a, 61b are held by the retention recesses 51b in the depth direction X and in the height direction Z.

As shown in FIG. 6 the first refrigerant pipe 61a has a first connection portion 61c and a second connection portion 61e. The first refrigerant pipe 61b has a first connection portion 61d and a second connection portion 61f. The first connection portions 61c, 61d are the parts that are connectable to the refrigerant pipes 11a, 11b that extend from the outdoor unit 10 from the one side of the width direction (+Y side) of the case 40. The second connection portions 61e, 61f are the parts that are connectable to the refrigerant pipes 11a, 11b that extend from the outdoor unit 10 to the other side of the width direction (−Y side) of the case 40.

FIG. 1 and FIG. 2 show a case where the refrigerant pipe 11a is connected to the first connection portion 61c, and the refrigerant pipe 11b is connected to the first connection portion 61d. In a state where the refrigerant pipes 11a, 11b that extend out from the outdoor unit 10 are connected to a connection portion out of connection portions of the first connection portions 61c, 61d and the second connection portions 61e, 61f, the other connection portion out of the connection portions of the first connection portions 61c, 61d and the second connection portions 61e, 61f is in a state of being blocked. In other words, the second connection portions 61e, 61f are in a state of being blocked in the examples of FIG. 1 and FIG. 2.

As shown in FIG. 2, the first connection portions 61c, 61d are exposed to the outside of the case 40 through the through hole 44a that is provided on the side surface panel 44 that is one side surface panel out of a pair of the side surface panels 44, 45. The first connection portions 61c, 61d in the present embodiment are passed through the through hole 44a, and are exposed to the one side of the width direction (+Y side) more than the case 40.

As shown in FIG. 3, the second connection portions 61e, 61f are exposed to the outside of the case 40 through the through hole 45a that is provided on the side surface panel 45 that is the other side surface panel out of the pair of the side surface panels 44, 45. The second connection portions 61e, 61f in the present embodiment are passed through the through hole 45a, and are exposed to the other side of the width direction (−Y side) more than the case 40. As such, both end portions of the width direction Y of the first refrigerant pipes 61a, 61b protrude to the outside of the case 40 in the width direction Y.

The plurality of second refrigerant pipes 62 are pipes that are connected to each of the plurality of refrigerant pipes 21a, 21b that protrude from the outdoor unit 10. As shown in FIG. 5, the plurality of second refrigerant pipes 62 extend in the depth direction X. The plurality of second refrigerant pipes 62 include a pair of second refrigerant pipes 62a, 62b. The second refrigerant pipes 62a are liquid pipes, and the second refrigerant pipes 62b are gas pipes. A refrigerant in a gas-liquid two-phase may for example, flow through the second refrigerant pipes 62a. A refrigerant in a gas phase may for example, flow through the second refrigerant pipes 62b. An inner diameter of the second refrigerant pipe 62b is larger than an inner diameter of the second refrigerant pipe 62a. Eight pairs of the pair of second refrigerant pipes 62a, 62b are provided along the width direction Y in the present embodiment. In other words, a total of 16 of the second refrigerant pipes 62 are provided in the present embodiment.

The second refrigerant pipes 62a, are located on a top side more than the second refrigerant pipes 62b. A plurality of second refrigerant pipes 62a are disposed adjacently at intervals in the width direction Y. A plurality of second refrigerant pipes 62b are disposed adjacently at intervals in the width direction Y more on a bottom side than the plurality of second refrigerant pipes 62a. The plurality of second refrigerant pipes 62a protrude to the other side of the depth direction (−X side) more than the thermal insulation member 50, each passing through the retention recesses 53a. The plurality of second refrigerant pipes 62b protrude to the other side of the depth direction more than the thermal insulation member 50, each passing through the retention recesses 51a. Each of the second refrigerant pipes 62a, 62b are held by each of the retention recesses 51a, 53a in the width direction Y and in the height direction Z. As shown in FIG. 3, the plurality of second refrigerant pipes 62a, 62b in the present embodiment protrude to the other side of the depth direction more than the case 40, through the opening of the other side of the depth direction of the case 40.

As shown in FIG. 2, end portions on the other side of the depth direction (−X side) of each of the pair of pair of second refrigerant pipes 62a, 62b is connected to each of a pair of refrigerant pipes 21a, 21b that extend from each of the indoor units 20. Each of the refrigerant pipes 21a is connected to each of the second refrigerant pipes 62a. Each of the refrigerant pipes 21b is connected to each of the second refrigerant pipes 62b. The second refrigerant pipes 62 are connected to the first refrigerant pipes 61. The plurality of the second refrigerant pipes 62a are connected to the first refrigerant pipe 61a. The plurality of the second refrigerant pipes 62b are connected to the first refrigerant pipe 61b.

As shown in FIG. 6, the plurality of solenoid valves 70 are provided in each of the plurality of second refrigerant pipes 62a which are liquid pipes, out of the plurality of the second refrigerant pipes 62. In the present embodiment, a single solenoid valve 70 is provided for each of the second refrigerant pipes 62a. In other words, a total of eight solenoid valves 70 are provided in the present embodiment. No solenoid valves 70 are provided in the second refrigerant pipes 62b which are gas pipes.

It is possible for each of the solenoid valves 70 provided inside the second refrigerant pipes 62a to open and close the inside of the second refrigerant pipes 62a. Each of the solenoid valves 70 is controlled by the controller 80. The solenoid valves 70 in the present embodiment are linear expansion valves (LEV: Linear Expansion Valves). It is possible for each of the solenoid valves 70 to decrease a pressure of the refrigerant flowing inside each of the second refrigerant pipes 62a. By controlling a degree of opening of each of the solenoid valves 70, an amount of refrigerant that flows to each of the indoor units 20 is adjustable.

The wire 73 extends from each of the plurality of solenoid valves 70. A plurality of wires 73 are pulled out from an inside of the thermal insulation member 50 to the one side of the depth direction (+X side) through the first through hole 55, in a state where the wires 73 are bunched in a wire bunch 73a. The plurality of wires 73 are electrically connected to the controller 80. Signals and electric power are input into each of the solenoid valves 70 through each wire 73 from the controller 80.

The controller 80 controls the plurality of solenoid valves 70. As shown in FIG. 7 and in FIG. 8, the controller 80 extends in the width direction Y. The controller 80 is disposed so as to face the one side of the depth direction (+X side) of the partition wall portion 54. As is mentioned later on, the attachment orientation of the controller 80 with respect to the case 40 is changeable. Hereinafter, when describing the various parts of the controller 80, unless otherwise specified, a case where the controller 80 is attached to the case 40 in an orientation such as the orientation shown in FIG. 7. As shown in FIG. 8, the controller 80 has a base member 81, a holding member 82, a substrate assembly 83, a second terminal portion 84, a clamp portion 85, and a connection wire 86.

Figure 9:
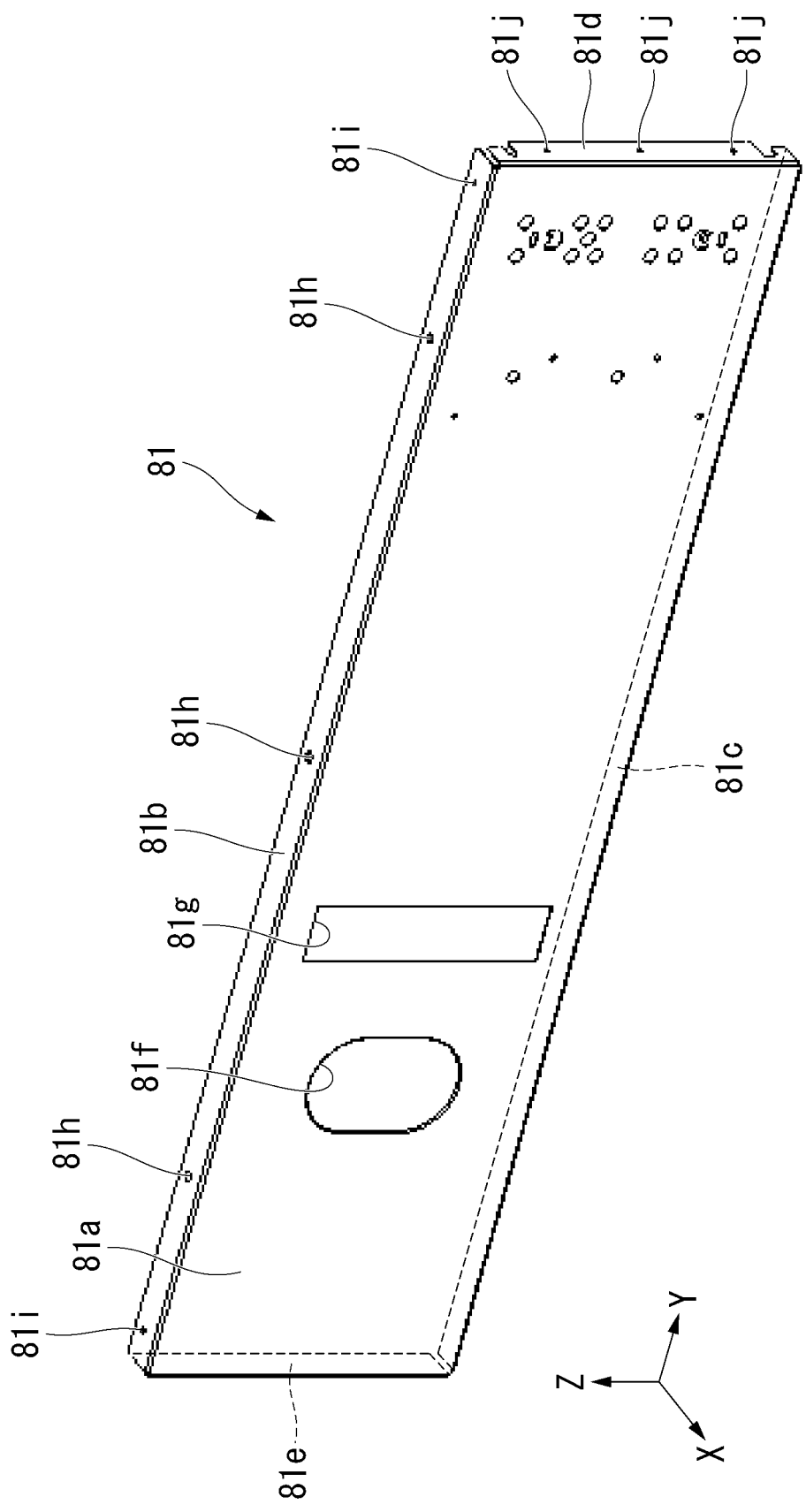
FIG. 9 A perspective view that shows a base member in the embodiment.

FIG. 9 is a perspective view that shows the base member 81. The base member 81 extends in the width direction Y. The base member 81 in the present embodiment is made of a formed metallic flat member. The base member 81 has a main body portion 81a, a protruding wall portion 81b, 81c, 81d, and 81e. The main body portion 81a is a flat surface that faces the depth direction X, and is a long rectangular shape in the width direction Y. The protruding wall portion 81b protrudes from an edge portion of the top side of the main body portion 81a to the other side of the depth direction (−X side). The protruding wall portion 81c protrudes from an edge portion of the bottom side of the main body portion 81a to the other side of the depth direction. The protruding wall portion 81b, 81c are flat surfaces that face the height direction Z, and are long rectangular shapes in the width direction Y. The protruding wall portion 81b is disposed so as to overlap with the top side of the edge portion of the one side of the depth direction (+X side) of the top panel 42. As shown in FIG. 2, an edge portion of the other side of the depth direction of a first cover portion 43a in the controller cover 43 is disposed so as to overlap on a top side of the protruding wall portion 81b.

As shown in FIG. 9, bolt holes 81h that penetrate the protruding wall portion 81b in the height direction Z are provided in the protruding wall portion 81b. Three bolt holes 81h are provided at intervals in the width direction Y. As shown in FIG. 2, a notch 43d is provided in each portion out of portions of the edge portion of the other side of the depth direction (−X side) of the first cover portion 43a that overlaps with the bolt holes 81h in the height direction Z. Each of the bolt holes 81h and a circumferential portion of the bolt holes 81h out of portions of the protruding wall portion 81b are exposed on the top side of the case 40, through each of notches 43d. Although omitted from the drawings, as is the case with the protruding wall portion 81b, three bolt holes 81h are provided in the protruding wall portion 81c as well.

As shown in FIG. 9, threaded holes 81i that penetrate the protruding wall portion 81b in the height direction Z are provided in the protruding wall portion 81b. Two threaded holes 81i are provided so as to sandwich the three bolt holes 81h in the width direction Y. The two threaded holes 81i are provided on each of the both end portions of the width direction Y of the protruding wall portion 81b. Bolts that are passed through from the top side in the threaded holes 81i are fastened to bolt holes 43c provided on the edge portion of the other side (−X side) of the depth direction of a first cover portion 43a. As such, the controller cover 43 is fixed to the base member 81. Although omitted from the drawings, as is the case with the protruding wall portion 81b, two threaded holes 81i are provided in the protruding wall portion 81c as well.

The protruding wall portion 81d protrudes other side of the depth direction (−X side) from the edge portion of the one side of the width direction (+Y side) of the main body portion 81a. The protruding wall portion 81e protrudes to the other side of the depth direction from the edge portion of the other side of the width direction (−Y side) of the main body portion 81a. Protruding wall portions 81d, 81e are flat surfaces that face the width direction Y, and are long rectangular shapes in the height direction Z.

Threaded holes 81j that penetrate the protruding wall portion 81d in the width direction Y are provided in the protruding wall portion 81d. Three threaded holes 81j are provided at intervals in the height direction Z. Although omitted from the drawings, as is the case with the protruding wall portion 81d, three threaded holes 81j are provided in the protruding wall portion 81e as well.

The base member 81 is attached to the case 40 by a plurality of bolts, and is detachable with respect the case 40. As such, the controller 80 is attached so as to be detachable with respect to the case 40. In other words, the base member 81 is detachably fixed with respect to the case 40 by three bolts that are inserted from the top side in the bolt holes 81h and that are fastened to the threaded holes provided in the edge portion of the one side of the depth direction (+X side) of the top panel 42, and by six bolts that are inserted into each of the bolt holes provided in the side surface panels 44, and that are fastened to each of the threaded holes 81j.

The base member 81 has a second through hole 81f that penetrates the base member 81 in the depth direction X. The second through hole 81f is provided in a portion out of portions of the main body portion 81a in the other side of the width direction (−Y side). The second through hole 81f in the present embodiment is a long oval shaped hole in the height direction Z. As shown in FIG. 8, the plurality of wires 73 that extend from the plurality of solenoid valves 70 are inserted through the second through hole 81f.

As shown in FIG. 9, the base member 81 has attachment hole 81g that penetrates the base member 81 in the depth direction X. The attachment hole 81g is provided in a portion out of portions of the main body portion 81a in the other side of the width direction (−Y side). The attachment hole 81g is located to the one side of the width direction (+Y side) more than the second through hole 81f. The attachment hole 81g is a long rectangular shaped hole in the height direction Z. The attachment hole 81g protrudes to both sides of the height direction Z more than the second through hole 81f.

As shown in FIG. 8, the holding member 82 is a member that holds the substrate assembly 83. The holding member 82 extends in the width direction Y The holding member 82 in the present embodiment is a member made of resin. The holding member 82 is disposed so as to face the one side of the depth direction (+X side) of the base member 81. The holding member 82 is fixed to a center of the width direction Y on a surface of the one side of the depth direction of the main body portion 81a. The holding member 82 is located in the one side of the width direction (+Y side) more than the second through hole 81f. The end portion of the other side of the width direction (−Y side) of the holding member 82 covers the attachment hole 81g from the one side of the depth direction.

As shown in FIG. 5, a pair of claw portions 82a that are inserted in the attachment hole 81g from the one side of the depth direction (+X side) to the other side of the depth direction (−X side) are provided in the end portion of the other side of the width direction (−Y side) of the holding member 82. The pair of claw portions 82a hook to the edge portion of the other side of the width direction of the attachment hole 81g of a surface out of surfaces of the other side of the depth direction of the main body portion 81a, from the other side of the depth direction. The holding member 82 is fixed to the base member 81 by having the pair of claw portions 82a be hooked to the edge portion of the attachment hole 81g, as well as by having the end portion of the one side of the width direction (+Y side) of the holding member 82 be fixed by bolts to the base member 81.

As shown in FIG. 8, the substrate assembly 83 has a substrate 83a, a first terminal portion 83b, a third terminal portion 83c, and a fourth terminal portion 83d. The substrate 83a, is a flat surface that faces the depth direction X, and is a long rectangular shape in the width direction Y. The substrate 83a is a printed board to which a wiring pattern not shown is printed. The substrate 83a is held in the one side of the depth direction (+X side) of the holding member 82. The substrate 83a is attached to the base member 81 through the holding member 82. The substrate 83a is located in the one side of the width direction (+Y side) more than the second through hole 81f. In other words, the second through hole 81f is disposed in a location that is offset in the width direction Y with respect to the substrate 83a. The first terminal portion 83b, the third terminal portion 83c, and the fourth terminal portion 83da are electrically connected to the substrate 83a.

The first terminal portion 83b is attached to the one side of the depth direction (+X side) of the substrate 83a. The first terminal portion 83b is provided on the end portion of the other side of the width direction (−Y side) of the substrate 83a. The plurality of wires 73 that extend from the plurality of solenoid valves 70 are connected to the first terminal portion 83b.

The plurality of wires 73, after being pulled out from an inside of the thermal insulation member 50 to the one side of the depth direction (+X side) through the first through hole 55 in a state where the wires 73 are bunched in a wire bunch 73a, are inserted into the second through hole 81f from the other side of the depth direction (−X side), and are pulled out more to the one side of the depth direction more than base member 81. The plurality of wires 73 pulled out to the one side of the depth direction more than the base member 81 are separated from the wire bunch 73a, and are each electrically connected to the first terminal portion 83b.

The wires 73 are detachable from the other side of the width direction (−Y side) in the first terminal portion 83b. A method of connecting the wires 73 with respect to the first terminal portion 83b is not particularly limited to a certain method.

The third terminal portion 83c is attached to a surface of the one side of the depth direction (+X side) of the substrate 83a. The third terminal portion 83c is provided on the end portion of the one side of the width direction (+Y side) of the substrate 83a. The third terminal portion 83c is disposed in a location closer to the first connection portions 61c, 61d to which the refrigerant pipes 11a, 11b are connected, more than the first terminal portion 83b in the width direction Y. A plurality of wires 22 that extend from the indoor units 20 are connected in the third terminal portion 83c. The wires 22 are detachable from the one side of the width direction in the third terminal portion 83c. A method of connecting the wires 22 with respect to the third terminal portion 83c is not particularly limited to a certain method.

The fourth terminal portion 83d is attached to a surface of the one side of the depth direction (+X side) of the substrate 83a. The fourth terminal portion 83d is provided on a portion out of portions of the edge portion of the top side closer to the one side of the width direction (towards +Y). The fourth terminal portion 83d is located to the one side of the width direction more than the first terminal portion 83b, and is located to the other side of the width direction (−Y side) more than the third terminal portion 83c. An end of the connection wire 86 is electrically connected to the fourth terminal portion 83d. A method of connecting the connection wire 86 with respect to the fourth terminal portion 83d is not particularly limited to a certain method.

The second terminal portion 84 is provided in the base member 81. The second terminal portion 84 is attached to a portion located in the one side of the width direction (+Y side) more than the holding member 82 and the substrate 83a out of the main body portion 81a of the base member 81. The second terminal portion 84 is located to the one side of the width direction more than the first terminal portion 83b and the third terminal portion 83c. In other words, the first terminal portion 83b, the second terminal portion 84, and the third terminal portion 83c are disposed in mutually differing locations in the width direction Y. As seen from the depth direction X, the first terminal portion 83b and the second terminal portion 84 are disposed in a location that sandwiches the third terminal portion 83c in the width direction Y.

The second terminal portion 84 in the present embodiment is disposed in a location farther from the second through hole 81f in the width direction Y, more than the protruding wall portion 81b. In other words, the first terminal portion 83b is disposed in a location closer to the second through hole 81f in the width direction Y, more than the second terminal portion 84. The second terminal portion 84 in the present embodiment is located in the other side of the depth direction (−X side) more than the first terminal portion 83b and the third terminal portion 83c. The second terminal portion 84 is disposed in a location closer to the first connection portions 61c, 61d to which the refrigerant pipes 11a, 11b are connected, more than the first terminal portion 83b in the width direction Y. Two of the second terminal portion 84 are provided adjacently in the height direction Z in the present embodiment.

The other end of the connection wire 86 is electrically connected to the second terminal portion 84. The second terminal portion 84 is electrically connected to the substrate 83a through the connection wire 86. The connection wire 86 is electrically connected to the second terminal portion 84 and the fourth terminal portion 83*d*. The connection wire 86 in the present embodiment is formed of a pair of three wires, for a total of six wires. Each of the pair of three wires is connected to one of two second terminal portions 84. The six wires are connected to the fourth terminal portion 83*d* in a state where the six wires are bundled together. The connection wire 86 is detachable from the other side of the width direction (−Y side) in the second terminal portion 84. A method of connecting the connection wire 86 with respect to the second terminal portion 84 is not particularly limited to a certain method.

The wires 12*a*, 12*b* that extend from the outdoor unit 10 are connected to the second terminal portion 84. The wires 12*a* and wires 12*b* are connected to each of the two second terminal portion 84 respectively. One of the wires 12*a* and wires 12*b* are electric power lines, and the other one of the wires 12*a* and wires 12*b* are communication lines.

A clamp 85 is provided in the base member 81. The clamp 85 is attached to a portion out of portions of the main body portion 81*a* of the base member 81 that is located on a portion in the one side of the width direction (+Y side) more than the second terminal portion 84. Although omitted from the drawings, it is possible for the clamp 85 to hold the wires 12*a*, 12*b* that extend from the outdoor unit 10 and the wires 22 that extend from the indoor units 20 by sandwiching the wires thereof.

The wires 12*a*, 12*b* that extend from the outdoor unit 10 and the wires 22 that extend from the indoor units 20 in FIG. 8 are inserted to the inside of the case 40 through the wiring holes 47 provided from the one side of the width direction (+Y side) of the case 40 to the side surface panel 44. As shown in FIG. 4, the wires 12*a*, 12*b*, and 22 are inserted through the wiring holes 47 through slits 46*a* of the cap members 46. The wires 12*a* and the wires 12*b* are inserted one at a time, each in differing wiring holes 47. A plurality of the wires 22 are inserted two at a time through one of the wiring holes 47.

The signals and the electric power are supplied from the outdoor unit 10 to the controller 80 through the wires 12*a*, 12*b*. The controller 80 controls the plurality of solenoid valves 70 based on the signals from the outdoor unit 10. A portion of the electric power supplied to the controller 80 from the outdoor unit 10 is supplied to the plurality of solenoid valves 70. The other portion of the electric power supplied to the controller 80 from the outdoor unit 10 is supplied to each of the indoor units 20 through each of the wires 22.

Figure 10:
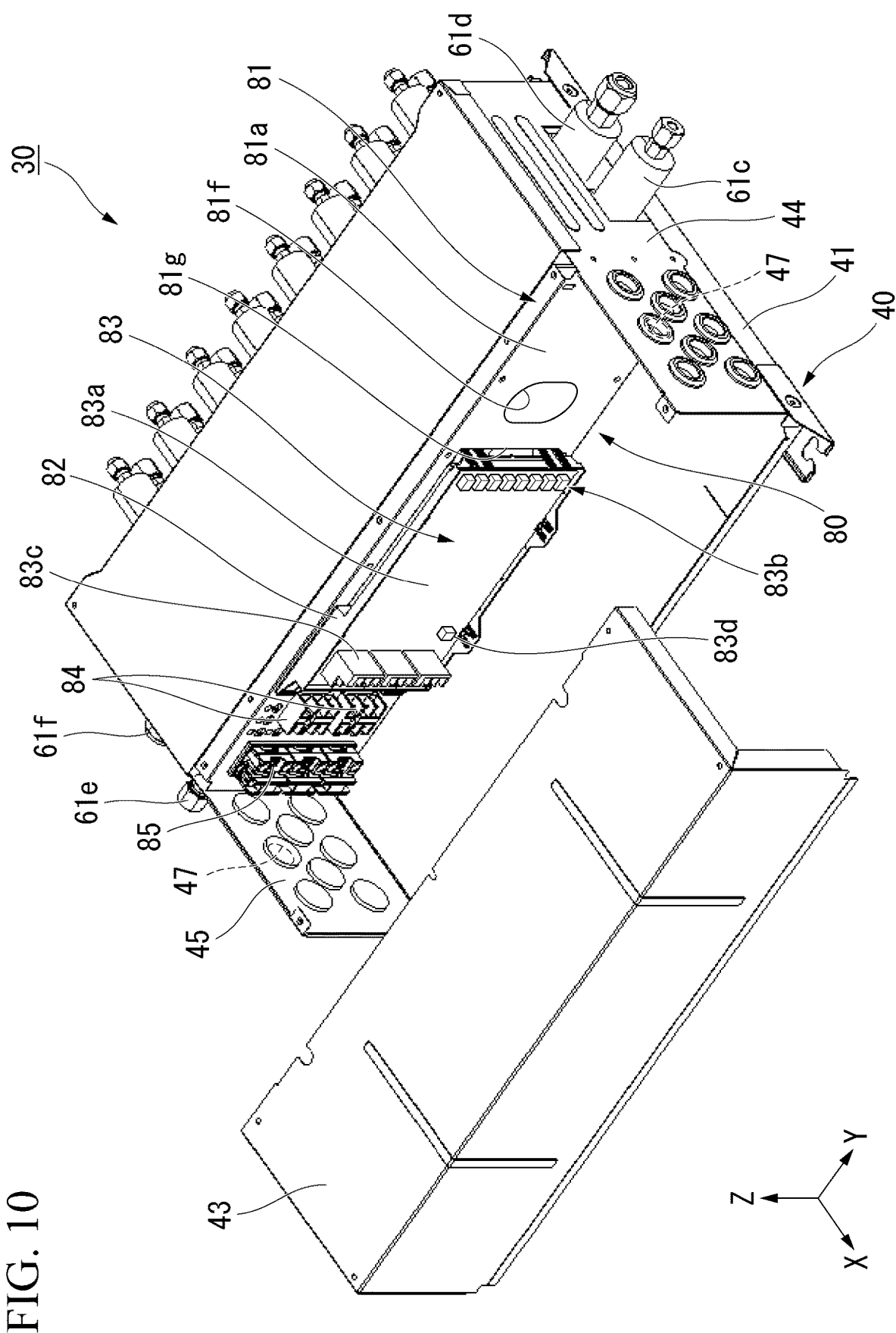
FIG. 10 An exploded perspective view that shows an attachment state of the refrigerant distribution device in the embodiment, and is a view that shows the controller shown in FIG. 7 in a state where the controller is rotated 180 degrees axially, and is attached to the case.

As shown in FIG. 8, in a state where the controller cover 43 is removed by removing the plurality of bolts that fix the base member 81 to the case 40, it is possible to remove the entirety of the controller 80 from the case 40. It is possible to attach the controller 80 to the case 40 in a state where the controller 80 is rotated 180 degrees around the axis AX that extends in the depth direction X orthogonal to the width direction Y. FIG. 10 is an exploded perspective view that shows the refrigerant distribution device 30, and is a view that shows the controller 80 shown in FIG. 7 in a state where the controller 80 is rotated 180 degrees around the axis AX, and the controller 80 is in a state of being attached to the case 40. The state of the controller 80 shown in FIG. 10 faces the width direction Y and the height direction Z in an opposite manner, with respect to the state of the controller 80 shown in FIG. 7. It is possible to change the state of attachment of the controller 80, in a state where the wires 73 that extend from the plurality of solenoid valves 70 are connected with respect to the controller 80, prior to a state where the wires 12*a*, 12*b*, and 22 are connected.

In the present description, the phrase "it is possible to attach the controller to the case in a state where the controller is axially rotated 180 degrees" includes a case where the controller is attachable to the case in a state after the controller is exactly rotated 180 degrees axially, and a case where the controller is attachable to the case in a state after the controller is roughly rotated 180 degrees axially. The phrase "the controller is attachable to the case in a state after the controller is roughly rotated 180 degrees axially" for example, includes a case where the controller is attachable to the case in a state after the controller is rotated 180 degrees+/−10 degrees.

Next, an installation operation of the refrigerant distribution device 30 is explained. An operator fixes the refrigerant distribution device 30 to a ceiling or the like. Based on the relative positional relationship between the refrigerant distribution device 30 and the outdoor unit 10, the refrigerant pipes 11*a*, 11*b* are connected to a connection portion out of the connection portions of the first connection portions 61*c*, 61*d* and the second connection portions 61*e*, 61*f* of the refrigerant distribution device 30, after determining to which connection portions thereof are the refrigerant pipes 11*a*, 11*b* that extend from the outdoor unit 10 going to be connected to. The operator connects the refrigerant pipes 21*a*, 21*b* that extend from the plurality of indoor units 20 to end portions of the refrigerant pipes out of the second refrigerant pipes 62 that protrude from the case 40.

Next, the operator conducts the connection operation of the controller 80 to the wires 12*a*, 12*b* that extend from the outdoor unit 10, and the plurality of wires 22 that extend from the plurality of indoor units 20. Here, the operator removes the controller cover 43, and confirms the location in the width direction Y of the wires 12*a*, 12*b* that connect to the second terminal portion 84, and the location in the width direction Y of the wires 22 that connect to the third terminal portion 83*c*. If the second terminal portion 84 and the third terminal portion 83*c*, more than the first terminal portion 83*b*, are in a location in the width direction Y that is closer to the connection portion to which the refrigerant pipes 11*a*, 11*b* are connected to, the operator keeps the controller 80 in the current state, and proceeds to conducting the connection operation of the wires 12*a*, 12*b*, and 22. On the other hand, if the second terminal portion 84 and the third terminal portion 83*c*, more than the first terminal portion 83*b*, are in a location in the width direction Y that is farther from the connection portion to which the refrigerant pipes 11*a*, 11*b* are connected to, after removing and rotating the controller 80 180 degrees around the axis AX, the operator reattaches the controller 80 to the case 40. The operator then proceeds to conduction the connection operation of the wires 12*a*, 12*b*, and 22 to the controller 80 after the controller 80 is reattached.

When conducting the connection operation of the wires 12*a*, 12*b*, and 22, the operator inserts the wires 12*a*, 12*b*, and 22 through the wiring holes 47 provided on the side surface panel out of side surface panels 44, 45 that is disposed on a same side as the side the connection portion of the refrigerant pipes 11*a*, 11*b* are connected to is located on. At such time, the operator only forms the slits 46*a* on the cap members 46 that are attached to the wiring holes 47 through which the wires 12*a*, 12*b*, and 22 are inserted. The wires 12*a*, 12*b*, and 22 are inserted to the inside of the case 40 through the above mentioned slits 46*a*. The operator connects the wires 12*a*, 12*b*, and 22 inserted to the inside of the case 40 to each of the second terminal portion 84 and the third terminal portion 83*c*.

The operator reattaches the controller cover 43 after finishing the connection operation of the wires 12*a*, 12*b*, and 22. As such, the installation operation of the refrigerant distribution device 30 is finished. It is possible to conduct the connection operation of the refrigerant pipes 11*a*, 11*b* that extend from the outdoor unit 10, the connection operation of the refrigerant pipes 21*a*, 21*b* that extend from the indoor units 20, the connection operation of the wires 12*a*, 12*b* that extend from the outdoor unit 10, and the connection operation of the wires 22 that extend from the indoor units 20 in any order.

Since both the refrigerant pipes 11*a*, 11*b* and the wires 12*a*, 12*b* extend from a single outdoor unit 10, it is preferable, from an operability point of view, that the connection operations of the refrigerant pipes 11*a*, 11*b* and the wires 12*a*, 12*b* be conducted from the same direction with respect to the refrigerant distribution device 30. Conventionally however, due to the relative positional relationship of the outdoor unit 10 and the refrigerant distribution device 30, there are cases where it is difficult to connect the wires 12*a*, 12*b*.

Specifically, when the controller 80 is attached to the case 40 in the orientation shown in FIG. 7 for example, a case of connecting the refrigerant pipes 11*a*, 11*b* to the second connection portions 61*e*, 61*f* is considered. In such case, it is preferable to conduct the connection operation of the wires 12*a*, 12*b* from the same side as the side the second connection portions 61*e*, 61*f* are located on. In other words, to conduct the operation thereof from the other side of the width direction (−Y side). As such, the operator conducts the connection operation by inserting the wires 12*a*, 12*b* from the wiring holes 47 provided on the side surface panel 45 to the inside of the case 40. However, in the case the orientation of the controller 80 is as shown in FIG. 7, the second terminal portion 84 that connects the wires 12*a*, 12*b* is disposed closer to the one side of the width direction (towards +Y), and the distance in the width direction Y from the side surface panel 45 to the second terminal portion 84 is large. As such, the wires 12*a*, 12*b* need to be crossed over to the first terminal portion 83*b* and the substrate 83*a* in the width direction Y, and to connect the wires 12*a*, 12*b* to the second terminal portion 84. Therefore, connecting the wires 12*a*, 12*b* to the second terminal portion 84 is difficult. Specifically, in a case where the refrigerant distribution device 30 is installed to a ceiling or the like, it is easy for space available for conducting work with respect to the refrigerant distribution device 30 to become small. For such reason, it becomes even harder to connect the wires 12*a*, 12*b* to the second terminal portion 84.

As previously mentioned, in order to connect the wires 12*a*, 12*b* to the second terminal portion 84, the wires 12*a*, 12*b* need to be crossed over to the first terminal portion 83*b* and the substrate 83*a* in the width direction Y. As such, there is a risk of the wires 12*a*, 12*b* that are connected to the first terminal portion 83*b* interfering with the wires 73 of the solenoid valves 70. There is also a risk of the wires 12*a*, 12*b* being damaged due to rubbing against the substrate 83*a*.

When the second terminal portion 84 is configured so that the wires 12*a*, 12*b* are connected from the one side of the width direction (+Y side) as previously mentioned, the wires 12*a*, 12*b* inserted to the inside of the case 40 from the other side of the width direction (−Y side) need to be made to face the one side of the width direction inside the case 40 before being connected to the second terminal portion 84. As such, there is a risk that the wires 12*a*, 12*b* are damaged due to being bent.

As mentioned above, conventionally, there is a case where the connection work of the wires 12*a*, 12*b* is hard to conduct. As such, a case exists where conducting the connection operation of the outdoor unit 10 with respect to the refrigerant distribution device 30 is difficult. In such case, the wires 12*a*, 12*b* get damaged, and there is a risk of a reliability of the air conditioner 100 decreases.

In contrast to the above, the controller 80 according to the present embodiment is attached so as to be detachable with respect to the case 40, and is attachable to the case in a state where the controller 80 is rotated 180 degrees around the axis AX that extends in the depth direction X orthogonal to the width direction Y. As such, by rotating the controller 80 180 degrees around the axis AX, it is possible to change the location in the width direction Y of the second terminal portion 84. Specifically, when the refrigerant pipes 11*a*, 11*b* that extend from the outdoor unit 10 are connected to the second connection portions 61*e*, 61*f*, by rotating and connecting the controller 80 to the case 40 in the orientation shown in FIG. 10, it is possible to have the location of the second terminal portion 84 in the width direction Y be closer to the second connection portions 61*e*, 61*f*. In other words, it is possible to have the location of the second terminal portion 84 in the width direction Y be closer to the other side of the width direction (towards −Y). There is also no need to have the wires 12*a*, 12*b* cross over the first terminal portion 83*b* and the substrate 83*a*. As such, it is possible to easily connect the wires 12*a*, 12*b* inserted to the inside of the case 40 from the other side of the width direction to the second terminal portion 84. Therefore, it is possible to improve the operability of the of the connection operation when connecting the outdoor unit 10 to the refrigerant distribution device 30 in the present embodiment. As such, it is possible to easily connect the outdoor unit 10 to the refrigerant distribution device 30 without being constrained by the installation location of the refrigerant distribution device 30 and by the orientation of the refrigerant distribution device 30 during the installation of the refrigerant distribution device 30.

Since there is no need to have the wires 12*a*, 12*b* cross over the first terminal portion 83*b* and the substrate 83*a*, it is possible to suppress interference of the wires 12*a*, 12*b* with the wires 73 that extend from the solenoid valves 70. It is also possible to suppress the wires 12*a*, 12*b* from being damaged due to rubbing against the substrate 83*a*. By rotating the controller 80 180 degrees around the axis AX, it is possible to have the orientation of the second terminal portion 84 in the width direction Y face the opposite direction. As such, in the orientation of the controller 80 shown in FIG. 10, the second terminal portion 84 is in a state where the wires 12*a*, 12*b* are attachable from the other side of the width direction (−Y side). From the above, it is possible to connect the wires 12*a*, 12*b* to the second terminal portion 84 without changing the orientation of the wires 12*a*, 12*b* inserted to the inside of the case 40 from the other side of the width direction to the one side of the width direction (+Y side). Therefore, it is possible to suppress damage to the wires 12*a*, 12*b* by reducing bending in the wires 12*a*, 12*b*. From the above, according to the present embodiment, it is possible to increase the reliability of the air conditioner 100 provided with the refrigerant distribution device 30.

According to the present embodiment, the refrigerant pipes 11*a*, 11*b* that extend from the outdoor unit 10 are connected to one side of the connection portion of the first connection portions 61c, 61d and the second connection portions 61e, 61f. The second terminal portion 84 is disposed at a location close to the connection portion of the aforementioned one side, more than the first terminal portion 83b in the width direction Y. As such, it becomes easier to connect the wires 12a, 12b to the second terminal portion 84 from a side the aforementioned one side of the connection portion is located on. As previously mentioned, by making the controller 80 rotatable 180 degrees around the axis AX, even in a case where the refrigerant pipes 11a, 11b are connected to any one of the first connection portions 61c, 61d and the second connection portions 61e, 61f, by making the relative positional relationship of the first terminal portion 83b and the second terminal portion 84 be a relative positional relationship as the connections mentioned above, it is possible to easily connect the second terminal portion 84 and the wires 12a, 12b.

According to the present embodiment, the first connection portions 61c, 61d are exposed to the outside of the case 40 through the through hole 44a provided on a side of the pair of side surface panels 44, 45. The second connection portions 61e, 61f are exposed to the outside of the case 40 through the through hole 45a provided on the other side of the pair of side surface panels 44, 45. The wiring holes 47 through which the wires 12a, 12b that extend from the outdoor unit 10 are insertable are provided on each of the pair of side surface panels 44, 45. As such, when the first connection portions 61c, 61d and the refrigerant pipes 11a, 11b are connected, by inserting the wires 12a, 12b through the wiring holes 47 of the side surface panel 44, it is possible to easily insert the wires 12a, 12b to the inside of the case 40, from the side the refrigerant pipes 11a, 11b are connected to. In a case where the refrigerant pipes 11a, 11b are connected to the second connection portions 61e, 61f, by inserting the wires 12a, 12b to the wiring holes 47 of the side surface panel 45, it is possible to easily insert the wires 12a, 12b to the inside of the case 40, from the side the refrigerant pipes 11a, 11b are connected to. From the above, it is possible to easily connect the wires 12a, 12b to the second terminal portion 84. Therefore, it is possible to further improve the operability of the connection operation of the outdoor unit 10 to the refrigerant distribution device 30.

According to the present embodiment, the controller 80 has the third terminal portion 83c to which a plurality of wires 22 that extend from the plurality of indoor units are connected to. The wiring holes 47 that allow the wires 22 which extend from the indoor units 20 to be inserted through to each of the pair of side surface panels 44, 45 are provided. The third terminal portion 83c is disposed in a location closer to the one side of the connection portion to which the refrigerant pipes 11a, 11b that extend from the outdoor unit 10 are connected to, more than the first terminal portion 83b in the width direction Y. As such, by inserting the wires 22 through the wiring holes 47 of the one side of the side surface panel out of the side surface panels 44, 45, it is possible to insert the wires 22 to the inside of the case 40 from the side the refrigerant pipes 11a, 11b are connected to, and it is possible to easily connect the wires 22 to the third terminal portion 83c. By being able to rotate the controller 80 180 degrees around the axis AX, even in a case where the refrigerant pipes 11a, 11b are connected to any one of the first connection portions 61c, 61d and the second connection portions 61e, 61f, the relative positional relationship of the first terminal portion 83b and the third terminal portion 83c is made to be a relative positional relationship as the above, where it is possible to easily connect the third terminal portion 83c and the wires 22.

The cap members 46 are attached to the wiring holes 47 in the present embodiment. Before inserting any of the wires 12a, 12b, and 22 through, the wiring holes 47 are covered by the cap members 46. As such, before inserting any of the wires 12a, 12b, and 22 through, it is possible to effectively prevent foreign objects from entering to the inside of the case 40 from the wiring holes 47. By only forming the slit 46a on the cap members 46 through which the wires 12a, 12b, and 22 are inserted, it is possible to effectively prevent foreign objects from entering to the inside of the case 40 from the wiring holes 47 to which the wires 12a, 12b, and 22 are not inserted through. By having a configuration where the wires 12a, 12b, and 22 are inserted through the slits 46a that are formed onto the cap members 46 made of rubber, it is possible to eliminate the gaps which form on the inserted parts of the wires 12a, 12b, and 22 even after inserting the wires 12a, 12b, and 22 through the wiring holes 47. As such, it is possible to effectively prevent foreign objects from entering to the inside of the case 40 from the wiring holes 47 that have the wires 12a, 12b, and 22 inserted through.

According to the present embodiment, the third terminal portion 83c is provided on one end portion of the substrate 83a. The first terminal portion 83b is provided on the other end of the width direction Y of the substrate 83a. The second terminal portion 84 is provided on the base member 81, and is electrically connected to the substrate 83a through the connection wire 86. The first terminal portion 83b and the second terminal portion 84 are disposed in a location that sandwiches the third terminal portion 83c in the width direction Y, as seen from the depth direction X. As such, it becomes easier to make the location of the second terminal portion 84 in the width direction Y closer to the side surface panel 44 or the side surface panel 45, making it easier to connect the wires 12a, 12b that are inserted to the inside of the case 40 from the wiring holes 47 of the side surface panel 44 or the side surface panel 45. Since it is possible to effectively dispose the first terminal portion 83b and the second terminal portion 84 apart in the width direction Y, it is possible to effectively prevent the wires 12a, 12b that are connected to the second terminal portion 84 from interfering with the wires 73 of the solenoid valves 70 that are connected to the first terminal portion 83b.

According to the present embodiment, the refrigerant distribution device 30 includes the partition wall portion 54 located between the plurality of solenoid valves 70 and the controller 80 inside the case 40. The partition wall portion 54 has first through hole 55 through which the plurality of wires 73 that extend from the plurality of solenoid valves 70 are inserted. The first through hole 55 overlaps with the center of the controller 80 in the width direction Y, seen in the depth direction X. As such, even if the controller 80 is rotated around the axis AX 180 degrees, it is possible to suppress changes of the distance in the width direction Y between the first through hole 55 and the first terminal portion 83b. As such, even in a case where the controller 80 is attached to the case 40 in any one of the orientation shown in FIG. 7 or the orientation shown in FIG. 10, the length of the wires 73 needed to connect the solenoid valves 70 and the first terminal portion 83b does not change. Therefore, even if the controller 80 is rotated about the axis AX, it is possible to prevent a load from being applied to the wires 73 which extend from the solenoid valves 70. As such, it becomes easy to rotate the controller 80 around the axis AX in a state where the wires 73 are connected to the first terminal portion 83b.

According to the present embodiment, the base member 81 has the second through hole 81f through which the plurality of wires 73 that extend from the plurality of solenoid valves 70 are inserted. The second through hole 81f is disposed in a location that is offset with respect to the substrate 83a in the width direction Y. As such, the second through hole 81f is not covered by the substrate 83a, and it is easy to pull out the wires 73 from the second through hole 81f in the one side of the depth direction (+X side). The first terminal portion 83b is provided on the substrate 83a, and is disposed at a location close to the second through hole 81f in the width direction Y, more than the second terminal portion 84. As such, it is easy to connect the wires 73 pulled out from the second through hole 81f to the first terminal portion 83b.

Although an embodiment of the present disclosure is described above, the disclosure is not limited to the aforementioned various configurations of the embodiment, and the configurations and methods mentioned below may be adopted.

In a controller, a first terminal portion and a second terminal portion may be disposed in any location, so long as the first terminal portion and the second terminal portion are mutually disposed in differing locations in the first direction (width direction Y). The first terminal portion and the second terminal portion may both be provided on a substrate, and may both be provided on a base member or the like other than the substrate. The first terminal portion may also be provided on the base member or the like other than the substrate, and the second terminal portion may be provided on the substrate. When the first terminal portion or the second terminal portion are provided on the substrate, locations thereof are not limited to any specific location on the substrate. When the first terminal portion is provided on the base member or the like other than the substrate, the first terminal portion is connected to the substrate by a connection wire.

A third terminal portion may be disposed in any fashion on the controller. The third terminal portion may be provided on the base member or the like other than the substrate. In such a case, the third terminal portion and the substrate are connected by the connection wire. The third terminal portion may not be provided.

A number of solenoid valves is not limited to a specific number, so long as the number is greater than or equal to two. The solenoid valve may be any type of solenoid valve. If the solenoid valves are provided on each of at least two or more second refrigerant pipes out of a plurality of second refrigerant pipes, the solenoid valves may be provided on only a few of the second refrigerant pipes, or the solenoid valves may be provided on all of the second refrigerant pipes.

So long as a case houses at least a portion of a first refrigerant pipe, at least a portion of a plurality of second refrigerant pipes, a plurality of solenoid valves, and a controller, the case may have any configuration. The case may house the entirety of the first refrigerant pipe, and may house the entirety of the plurality of second refrigerant pipes. A guide groove for the controller may be provided in the case. Wiring holes provided on a pair of side walls of the case may be provided in any configuration. The wiring holes may for example be knockout type holes formed on a portion of the pair of side walls, and are opened when connection work of the wires is conducted. The wiring holes may for example be made by formed by breaking through the portion of the side walls when connection work of the wires is conducted.

The first refrigerant pipe may have any configuration so long as the first refrigerant pipes have a first connection portion and a second connection portion. So long as the first connection portion and the second connection portion are connectable to each of the refrigerant pipes that extend from an outdoor unit, the first connection portion and the second connection portion need not protrude from the case. So long as the plurality of the second refrigerant pipes are connected to the first refrigerant pipe, and are connected to each of the refrigerant pipes that extend from a plurality of outdoor units, the plurality of the second refrigerant pipes may have any configuration. So long as a number of the second refrigerant pipes is greater than or equal to two, the number thereof is not limited to a specific number.

A first through hole provided on a partition wall portion may be provided in any location on the partition wall portion. The partition wall portion may be provided. A thermal insulation member may not be provided. A second through hole provided in the base member may be provided in any location on the base member. The base member may not be provided. A holding member to hold the substrate may not be provided. The substrate may not be provided.

A refrigerant distribution device may be installed in any location. The refrigerant distribution device may be installed on a floor of a room, or may be installed so as to hang from a wall. A number of indoor units that may be connected to the refrigerant distribution device is not limited to a specific number, so long as the number is greater than or equal to two. Although the maximum number of the indoor units 20 that are connectable to the refrigerant distribution device 30 previously mentioned is eight, the actual number of indoor units 20 connected to the refrigerant distribution device 30 are not limited to a specific number, so long as the number is less than or equal to eight.

The various configurations and methods described in the above description of the present disclosure may be appropriately combined, as long as the configurations and methods thereof do not mutually contradict one another.

The invention claimed is:

1. A refrigerant distribution device that is provided in an air conditioner and distributes a refrigerant to a plurality of indoor units from an outdoor unit, the refrigerant distribution device comprising:
   first refrigerant pipes that are connected to refrigerant pipes that extend from the outdoor unit;
   a plurality of second refrigerant pipes that are connected to the first refrigerant pipes and are connected to each of the refrigerant pipes that extends from the plurality of indoor units;
   a plurality of solenoid valves that are provided on at least two or more of the second refrigerant pipes out of the plurality of second refrigerant pipes;
   a controller having a first terminal portion to which a plurality of wires that extend from the plurality of solenoid valves, and a second terminal portion to which wires that extend from the outdoor unit are connected to; and
   a case that houses at least a portion of the first refrigerant pipe, at least a portion of the plurality of second refrigerant pipes, the plurality of solenoid valves, and the controller therein,
   wherein
   the first refrigerant pipes have:
      a first connection portion located on a first side of the case and that is connectable to the refrigerant pipes that extend from the outdoor unit, and
      a second connection portion located on a second side of the case opposite the first side in a first direction and that is connectable to the refrigerant pipes that extend from the outdoor unit;

the first terminal portion and the second terminal portion are mutually disposed in differing locations in the first direction; and the controller is:
attached so as to be detachable with respect to the case, and is attachable to the case in a state where the controller is rotated 180 degrees around an axis that extends in a second direction orthogonal to the first direction.

2. The refrigerant distribution device according to claim 1, wherein the refrigerant pipes that extend from the outdoor unit are connected to a connection portion of one of the first connection portion and the second connection portion, and the second terminal portion is disposed in a location that is closer to the one connection portion, more than the first terminal portion in the first direction.

3. The refrigerant distribution device according to claim 2, wherein the case has a pair of side walls, each located on both sides in the first direction, the first connection portion is exposed to an outside of the case from through holes provided on one of the pair of side walls, the second connection portion is exposed to an outside of the case from the through holes provided on the other of the pair of side walls, and wiring holes that allow the wires which extend from the outdoor units to be inserted through are provided with each of the pair of side walls.

4. The refrigerant distribution device according to claim 3, wherein the controller has a third terminal portion to which the plurality of wires that extend from the plurality of indoor units are connected to, the wiring holes that allow the wires which extend from the indoor units to be inserted through are provided with each of the pair of side walls, and the third terminal portion is disposed in a location that is closer to the one connection portion, more than the first terminal portion in the first direction.

5. The refrigerant distribution device according to claim 4, wherein the controller has:
a substrate, and
a base member to which the substrate is attached to, wherein the third terminal portion is provided on an end of the first direction of the substrate;

the first terminal portion is provided on the other end of the first direction of the substrate;

the second terminal portion is provided on the base member, and is electrically connected to the substrate through a connection wire, and as seen from the second direction, the first terminal portion and the second terminal portion are disposed in a location that sandwiches the third terminal portion in the first direction.

6. The refrigerant distribution device according to claim 5, wherein:

the base member has a second through hole through which the plurality of wires that extend from the plurality of solenoid valves are inserted, the second through hole is disposed in a location that is offset in the first direction with respect to the substrate, and the first terminal portion is provided on the substrate, and is disposed in a location that is closer to the second through hole, more than the second terminal portion in the first direction.

7. The refrigerant distribution device according to claim 1, further comprising:

a partition wall portion located between the plurality of solenoid valves and the controller inside the case; wherein the partition wall portion has a first through hole through which the plurality of wires that extend from the plurality of solenoid valves are inserted, and the first through hole overlaps with the center of the controller in the first direction, seen in the second direction.

8. The refrigerant distribution device according to claim 2, further comprising:

a partition wall portion located between the plurality of solenoid valves and the controller inside the case; wherein the partition wall portion has a first through hole through which the plurality of wires that extend from the plurality of solenoid valves are inserted, and the first through hole overlaps with the center of the controller in the first direction, seen in the second direction.

9. The refrigerant distribution device according to claim 3, further comprising:

a partition wall portion located between the plurality of solenoid valves and the controller inside the case; wherein the partition wall portion has a first through hole through which the plurality of wires that extend from the plurality of solenoid valves are inserted, and the first through hole overlaps with the center of the controller in the first direction, seen in the second direction.

10. The refrigerant distribution device according to claim 4, further comprising:

a partition wall portion located between the plurality of solenoid valves and the controller inside the case; wherein the partition wall portion has a first through hole through which the plurality of wires that extend from the plurality of solenoid valves are inserted, and the first through hole overlaps with the center of the controller in the first direction, seen in the second direction.

11. The refrigerant distribution device according to claim 5, further comprising:

a partition wall portion located between the plurality of solenoid valves and the controller inside the case; wherein the partition wall portion has a first through hole through which the plurality of wires that extend from the plurality of solenoid valves are inserted, and the first through hole overlaps with the center of the controller in the first direction, seen in the second direction.

12. The refrigerant distribution device according to claim 6, further comprising:

a partition wall portion located between the plurality of solenoid valves and the controller inside the case; wherein the partition wall portion has a first through hole through which the plurality of wires that extend from the plurality of solenoid valves are inserted, and the first through hole overlaps with the center of the controller in the first direction, seen in the second direction.

* * * * *